US008800835B2

(12) United States Patent
Perron et al.

(10) Patent No.: US 8,800,835 B2
(45) Date of Patent: Aug. 12, 2014

(54) FASTENER DRIVING DEVICE WITH MODE SELECTOR AND TRIGGER INTERLOCK

(75) Inventors: Donald R. Perron, North Smithfield, RI (US); Paul J. Zerbarini, Westerly, RI (US); Tom Fang, Cranston, RI (US); Vivek Jeyasingh, Warwick, RI (US); Sean Lee, Dali (TW)

(73) Assignee: Stanley Fastening Systems, LP, North Kingstown, RI (US)

( * ) Notice: Subject to any disclaimer, the term of this patent is extended or adjusted under 35 U.S.C. 154(b) by 343 days.

(21) Appl. No.: 12/504,117

(22) Filed: Jul. 16, 2009

(65) Prior Publication Data

US 2010/0012700 A1 Jan. 21, 2010

Related U.S. Application Data

(60) Provisional application No. 61/129,761, filed on Jul. 17, 2008.

(51) Int. Cl.
*B21J 15/28* (2006.01)
*B27F 7/17* (2006.01)
*B23B 45/00* (2006.01)

(52) U.S. Cl.
USPC .......... 227/8; 173/170

(58) Field of Classification Search
USPC .......... 227/2, 130–138, 8, 120; 173/1–2, 201, 173/217; 251/129.01
See application file for complete search history.

(56) References Cited

U.S. PATENT DOCUMENTS 3,023,413 A * 3/1962 Fischer et al. .......... 227/5
3,172,124 A * 3/1965 Kremiller .......... 227/8
3,208,353 A * 9/1965 Wandel .......... 91/52
3,288,339 A * 11/1966 Bade .......... 227/130
3,490,545 A * 1/1970 Lange et al. .......... 173/2
3,498,517 A * 3/1970 Novak .......... 227/8
3,601,300 A * 8/1971 Anstett .......... 227/8

(Continued)

FOREIGN PATENT DOCUMENTS

| | | |
|---|---|---|
| DE | 3205407 | 9/1983 |
| GB | 2178355 | 2/1987 |
| JP | 09-225855 | 9/1997 |
| JP | 10-264052 | 10/1998 |

OTHER PUBLICATIONS

Extended European Search Report issued for EP Patent Appln. No. 09165811.2, dated Dec. 4, 2009.

*Primary Examiner* — Robert Long
(74) *Attorney, Agent, or Firm* — Pillsbury Winthrop Shaw Pittman LLP

(57) ABSTRACT

A fastener driving device includes a frame, a fastener driver reciprocally mounted in the frame, and a trigger assembly. The trigger assembly includes a trigger lever configured to be moved to an actuated position to actuate the fastener driving device, a mode selector rotatably mounted to the frame, the mode selector being configured to move to select a mode of operation of the fastener driving device, and a trigger lock mounted to the frame, the trigger lock being movable between a first position wherein actuation of the trigger lever is permitted and a second position wherein actuation of the trigger lever is prevented. In the first position, the trigger lock engages the mode selector to prevent the mode selector from moving. In the second position, the trigger lock disengages the mode selector to permit movement of the mode selector to select the mode of operation of the fastener driving device.

13 Claims, 14 Drawing Sheets

(56) References Cited

U.S. PATENT DOCUMENTS

| | | | | | |
|---|---|---|---|---|---|
| 3,612,379 | A | * | 10/1971 | Panock | 227/8 |
| 3,677,456 | A | * | 7/1972 | Ramspeck et al. | 227/8 |
| 3,708,096 | A | * | 1/1973 | Burke, Jr. | 227/130 |
| 3,774,699 | A | * | 11/1973 | Schmuck | 173/48 |
| 3,784,077 | A | | 1/1974 | Burke, Jr. et al. | 227/8 |
| 3,796,270 | A | * | 3/1974 | Lange | 173/15 |
| 3,888,404 | A | * | 6/1975 | Ramspeck et al. | 227/8 |
| 4,165,676 | A | * | 8/1979 | Siegmann | 91/461 |
| 4,196,833 | A | * | 4/1980 | Haytayan | 227/8 |
| 4,227,637 | A | * | 10/1980 | Haytayan | 227/8 |
| 4,260,092 | A | * | 4/1981 | Austin | 227/8 |
| 4,264,028 | A | | 4/1981 | Austin | 227/8 |
| 4,265,161 | A | * | 5/1981 | Beretta | 89/129.02 |
| 4,339,065 | A | * | 7/1982 | Haytayan | 227/8 |
| 4,378,084 | A | | 3/1983 | Scala | 227/8 |
| 4,432,483 | A | | 2/1984 | Kuck | 227/8 |
| 4,448,338 | A | * | 5/1984 | Graf et al. | 227/8 |
| 4,452,387 | A | * | 6/1984 | Haytayan | 227/8 |
| 4,509,668 | A | * | 4/1985 | Klaus et al. | 227/8 |
| 4,523,646 | A | | 6/1985 | Doyle et al. | 173/15 |
| 4,550,643 | A | | 11/1985 | Schwartzenberger | 91/356 |
| 4,629,106 | A | | 12/1986 | Howard et al. | 227/8 |
| 4,679,719 | A | | 7/1987 | Kramer | 227/5 |
| 4,784,308 | A | * | 11/1988 | Novak et al. | 227/130 |
| 4,811,882 | A | * | 3/1989 | Steeves et al. | 227/8 |
| 5,020,712 | A | * | 6/1991 | Monacelli | 227/8 |
| 5,035,354 | A | | 7/1991 | Meyer | 227/7 |
| 5,080,273 | A | * | 1/1992 | Meyer | 227/8 |
| 5,083,694 | A | | 1/1992 | Lemos | 227/8 |
| 5,131,579 | A | | 7/1992 | Okushima et al. | 227/8 |
| 5,137,197 | A | * | 8/1992 | Bauer | 227/8 |
| 5,174,485 | A | | 12/1992 | Meyer | 227/8 |
| 5,193,730 | A | * | 3/1993 | Tanaka et al. | 227/8 |
| 5,332,046 | A | * | 7/1994 | Tanimizu et al. | 172/739 |
| 5,366,132 | A | | 11/1994 | Simonelli | 227/8 |
| 5,485,946 | A | * | 1/1996 | Jankel | 227/8 |
| 5,522,532 | A | * | 6/1996 | Chen | 227/8 |
| 5,551,620 | A | | 9/1996 | Vallee | 227/8 |
| 5,551,621 | A | | 9/1996 | Vallee | 227/8 |
| 5,593,079 | A | | 1/1997 | Mukoyama et al. | 227/8 |
| 5,597,106 | A | * | 1/1997 | Hamano et al. | 227/8 |
| 5,662,257 | A | | 9/1997 | Mukoyama et al. | 227/8 |
| 5,669,541 | A | | 9/1997 | Ronconi | 227/8 |
| 5,669,542 | A | | 9/1997 | White | 227/8 |
| 5,671,880 | A | * | 9/1997 | Ronconi | 227/130 |
| 5,687,897 | A | | 11/1997 | Fa et al. | 227/8 |
| 5,692,663 | A | | 12/1997 | Yang | 227/8 |
| 5,715,982 | A | | 2/1998 | Adachi | 227/8 |
| 5,785,228 | A | | 7/1998 | Fa et al. | 227/8 |
| 5,791,545 | A | | 8/1998 | Lin | 227/8 |
| 5,797,533 | A | | 8/1998 | Lee | 227/8 |
| 5,829,660 | A | | 11/1998 | White | 227/8 |
| 5,836,501 | A | | 11/1998 | Lai | 227/8 |
| 5,862,969 | A | | 1/1999 | Lee | 227/8 |
| 5,865,360 | A | | 2/1999 | White | 227/130 |
| 5,930,929 | A | * | 8/1999 | Bubits | 42/70.06 |
| 6,006,975 | A | * | 12/1999 | Ishizawa | 227/119 |
| 6,059,161 | A | | 5/2000 | Chang et al. | 227/8 |
| 6,065,662 | A | | 5/2000 | Sauer | 227/130 |
| 6,116,488 | A | | 9/2000 | Lee | 227/8 |
| 6,213,372 | B1 | | 4/2001 | Chen | 227/8 |
| 6,357,647 | B1 | | 3/2002 | Ou | 227/8 |
| 6,371,348 | B1 | | 4/2002 | Canlas et al. | 227/8 |
| 6,419,140 | B1 | | 7/2002 | Chen | 227/8 |
| 6,422,446 | B1 | | 7/2002 | Liu | 227/8 |
| 6,431,425 | B1 | | 8/2002 | Moorman et al. | 227/8 |
| 6,450,387 | B1 | | 9/2002 | Chen | 227/8 |
| 6,481,145 | B2 | * | 11/2002 | Weichert et al. | 42/105 |
| 6,543,664 | B2 | * | 4/2003 | Wolfberg | 227/8 |
| 6,550,545 | B1 | * | 4/2003 | Manschitz et al. | 173/48 |
| 6,581,814 | B1 | | 6/2003 | Hsu | 227/8 |
| 6,588,642 | B1 | | 7/2003 | Wang et al. | 227/8 |
| 6,604,664 | B2 | | 8/2003 | Robinson | 227/8 |
| 6,641,018 | B2 | | 11/2003 | Akiba | 227/8 |
| 6,659,324 | B1 | | 12/2003 | Liu | 227/8 |
| 6,662,989 | B1 | | 12/2003 | Chang et al. | 227/8 |
| 6,675,999 | B2 | * | 1/2004 | Mukoyama et al. | 227/8 |
| 6,745,928 | B2 | | 6/2004 | Ishizawa et al. | 227/130 |
| 6,843,400 | B1 | * | 1/2005 | Lee | 227/8 |
| 6,854,631 | B2 | | 2/2005 | Burke et al. | 227/130 |
| 6,860,416 | B1 | | 3/2005 | Chen | 227/8 |
| 6,886,729 | B1 | | 5/2005 | Lee | 227/8 |
| 6,926,186 | B2 | | 8/2005 | Wells | 227/129 |
| 6,929,165 | B1 | | 8/2005 | Chen et al. | 227/8 |
| 7,004,367 | B1 | * | 2/2006 | Shen et al. | 227/8 |
| 7,104,433 | B2 | * | 9/2006 | Fujiyama | 228/8 |
| 7,137,540 | B2 | | 11/2006 | Terrell et al. | 227/8 |
| 7,143,918 | B2 | | 12/2006 | Aguirre et al. | 227/8 |
| 7,152,773 | B2 | | 12/2006 | Ke | 227/8 |
| 7,191,927 | B2 | * | 3/2007 | Segura | 227/8 |
| 7,213,733 | B1 | | 5/2007 | Wen | 227/8 |
| 7,278,561 | B2 | * | 10/2007 | Schnell et al. | 227/130 |
| 7,314,154 | B2 | | 1/2008 | Huang et al. | 227/8 |
| 7,322,426 | B2 | | 1/2008 | Aguirre et al. | 173/1 |
| 7,398,834 | B2 | * | 7/2008 | Jung et al. | 173/4 |
| 7,464,843 | B2 | * | 12/2008 | Huang | 227/8 |
| 7,464,844 | B2 | * | 12/2008 | Kamins et al. | 227/132 |
| 7,490,748 | B2 | * | 2/2009 | Komazaki | 227/130 |
| 7,677,426 | B2 | * | 3/2010 | Tillinghast et al. | 227/130 |
| 7,810,688 | B2 | * | 10/2010 | Wu et al. | 227/8 |
| 7,875,029 | B1 | * | 1/2011 | Hausen | 606/52 |
| 8,061,573 | B2 | * | 11/2011 | Kramer | 227/8 |
| 8,286,724 | B2 | * | 10/2012 | Furusawa et al. | 173/47 |
| 8,453,901 | B2 | * | 6/2013 | Suda | 227/8 |
| 8,511,399 | B2 | * | 8/2013 | Kunz | 173/48 |
| 2001/0006183 | A1 | * | 7/2001 | Mukoyama et al. | 227/8 |
| 2001/0022131 | A1 | * | 9/2001 | Moczijdlower et al. | 89/155 |
| 2002/0117531 | A1 | | 8/2002 | Schell et al. | 227/8 |
| 2002/0125290 | A1 | * | 9/2002 | Robinson | 227/8 |
| 2004/0011846 | A1 | * | 1/2004 | Aoki et al. | 227/130 |
| 2005/0001007 | A1 | * | 1/2005 | Butzen et al. | 227/130 |
| 2006/0060365 | A1 | * | 3/2006 | Kunz | 173/48 |
| 2006/0185866 | A1 | * | 8/2006 | Jung et al. | 173/48 |
| 2007/0034660 | A1 | | 2/2007 | Terrell et al. | 227/8 |
| 2007/0068990 | A1 | * | 3/2007 | Shelton et al. | 227/175.1 |
| 2007/0075113 | A1 | | 4/2007 | Tillinghast et al. | 227/130 |
| 2007/0119899 | A1 | * | 5/2007 | Ronconi | 227/130 |
| 2007/0251972 | A1 | * | 11/2007 | Lee | 227/130 |
| 2008/0017396 | A1 | * | 1/2008 | Kristen et al. | 173/162.2 |
| 2008/0149685 | A1 | * | 6/2008 | Smith et al. | 227/181.1 |
| 2009/0016834 | A1 | * | 1/2009 | Scrimshaw et al. | 408/139 |
| 2010/0012698 | A1 | * | 1/2010 | Liang et al. | 227/5 |
| 2010/0012699 | A1 | * | 1/2010 | Liang et al. | 227/8 |
| 2010/0025059 | A1 | * | 2/2010 | Felger | 173/47 |
| 2010/0038398 | A1 | * | 2/2010 | Liang et al. | 227/8 |
| 2010/0116863 | A1 | * | 5/2010 | Suda | 227/8 |
| 2010/0140314 | A1 | * | 6/2010 | Tillinghast et al. | 227/8 |
| 2010/0151775 | A1 | * | 6/2010 | Lampka et al. | 451/357 |
| 2010/0282483 | A1 | * | 11/2010 | Jung et al. | 173/48 |
| 2011/0113665 | A1 | * | 5/2011 | Cottle et al. | 42/73 |
| 2012/0074194 | A1 | * | 3/2012 | Miller et al. | 227/8 |
| 2012/0138326 | A1 | * | 6/2012 | Schlauch et al. | 173/170 |
| 2012/0205131 | A1 | * | 8/2012 | Furusawa et al. | 173/2 |

* cited by examiner

FASTENER DRIVING DEVICE WITH MODE SELECTOR AND TRIGGER INTERLOCK

CROSS-REFERENCE TO RELATED APPLICATIONS

This application claims the benefit of priority from U.S. Provisional Patent Application No. 61/129,761, filed on Jul. 17, 2008, the content of which is incorporated herein by reference in its entirety.

BACKGROUND

1. Field of Invention

This invention relates to fastener driving devices and, more particularly, to fastener driving devices having a mode selector and trigger lock and a method of selecting mode of operation.

2. Discussion of Related Art

Fastener driving tools for driving fasteners such as nails, staples or the like are commonly used in industry and commerce. The fasteners are generally supplied from a collated strip of fasteners disposed in a magazine coupled to a nosepiece portion of the fastener driving tool. The fastener driving tool also comprises a housing to store compressed air, a cylinder within the housing, a piston within the cylinder, a driver connected to the piston, and a main valve to provide pressurized air to operate the piston. Fastener driving tools also include a work contacting element coupled to a tool controlling mechanism operable as a safety feature to enable and disable the fastener driving tool. In some instances, this work contacting element is coupled with a depth adjusting mechanism that allows control and adjustment of the depth at which the fastener is driven into a work piece.

During operation of such tools, the tool is positioned in contact with a workpiece, such as wood or drywall, in such a manner as to allow the contacting element or the depth adjusting mechanism to be in direct contact with the work piece. The trigger is manually pulled to actuate a trigger valve which in turn operates the main valve that provides compressed air to move the piston. The trigger can also be made to be remotely controllable if desired.

SUMMARY

An aspect of the present invention is to provide a fastener driving device comprising a frame, a fastener driver reciprocally mounted in the frame, and a trigger assembly. The trigger assembly comprises a trigger lever configured to be moved to an actuated position to actuate the fastener driving device, a mode selector movably mounted to the frame, the mode selector being configured to move to select a mode of operation of the fastener driving device, and a trigger lock mounted to the frame, the trigger lock being movable between a first position wherein actuation of the trigger lever is permitted and a second position wherein actuation of the trigger lever is prevented. In the first position, the trigger lock engages the mode selector to prevent the mode selector from moving. In the second position, the trigger lock disengages the mode selector to permit movement of the mode selector to select the mode of operation of the fastener driving device.

Another aspect of the present invention is to provide a method of selecting a mode of operation of a fastener driving device having a trigger, a trigger lock, and a mode selector switch. The method comprises moving a trigger lock in a first direction to lock the trigger and release an engagement of the trigger lock with the mode selector switch; moving the mode selector switch to a desired mode of operation of the fastener driving device; and moving the trigger lock in a second direction opposite to the first direction to unlock the trigger and lock the mode selector switch.

Yet another aspect of the present invention is to provide a method of selecting a mode of operation of a fastener driving device having a trigger, a trigger lock, and a mode selector switch. The method comprises moving a trigger lock in a first direction to lock the trigger; moving the mode selector switch by applying a counteracting force to counteract a biasing force biasing the mode selector switch towards a frame of the fastener driving device so as to release an engagement of the trigger lock with the mode selector switch; moving the mode selector switch to a desired mode of operation of the fastener driving device; releasing the counteracting force applied to the mode selector switch; and moving the trigger lock in a second direction opposite to the first direction to unlock the trigger and lock the mode selector switch.

A further aspect of the present invention is to provide a trigger assembly for a fastener driving device. The trigger assembly includes a trigger lever configured to be moved to an actuated position, a mode selector configured to be movably mounted to the fastener driving device, the mode selector being configured to move to select a mode of operation of the fastener driving device, and a trigger lock configured to be mounted to the fastener driving device. The trigger lock is movable between a first position wherein movement of the trigger lever to the actuated position is permitted and a second position wherein movement of the trigger lever to the actuation position is prevented. In the first position, the trigger lock engages the mode selector to prevent the mode selector from moving. In the second position, the trigger lock disengages the mode selector to permit movement of the mode selector to select the mode of operation of the fastener driving device.

Other aspects of the present invention are to provide a device of the type describe above which is combined with other features hereafter described in detail.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well. As used in the specification and in the claims, the singular form of “a”, “an”, and “the” include plural referents unless the context clearly dictates otherwise.

BRIEF DESCRIPTION OF THE DRAWINGS

Features of the invention are shown in the drawings, in which like reference numerals designate like elements. The drawings form part of this original disclosure, in which.

DETAILED DESCRIPTION

Figure 1:
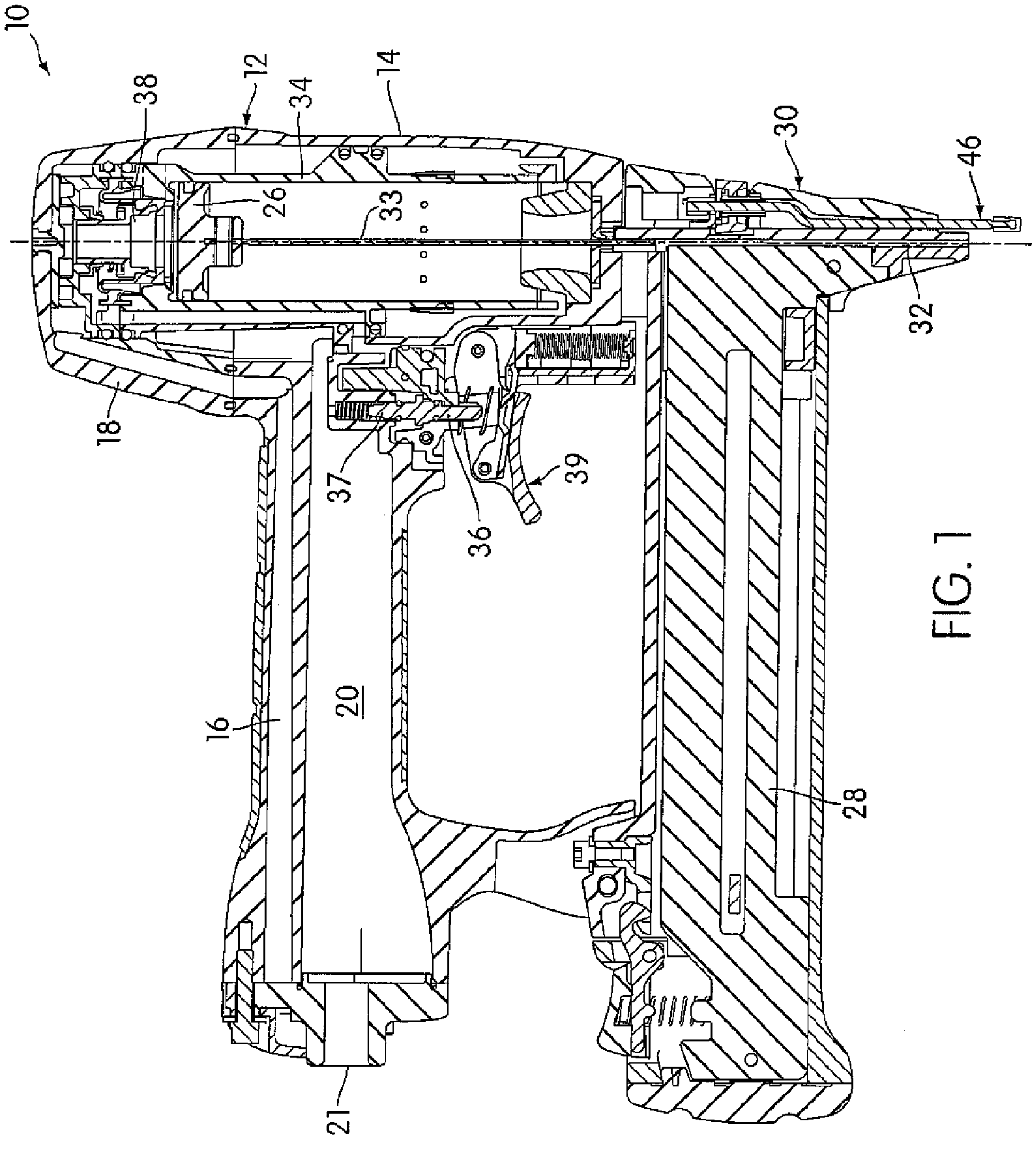
FIG. 1 is a sectional view of the fastener driving device, according to an embodiment of the present invention.

FIG. 1 illustrates a fastener driving device 10, according to an embodiment of the present invention. A detailed description of a fastener driving device can be found in U.S. Pat. No. 6,854,631 and U.S. Patent Application Publication No. 2007/0075113, the content of each of which is incorporated herein by reference in its entirety. The device 10 includes a housing 12. The housing 12 is preferably constructed from a lightweight yet durable material, such as magnesium. The housing 12 includes a cylinder containing body portion 14, a handle portion 16, and a cap portion 18. The size and shape of these components can vary considerably depending on the type of fastener and application, but all have in common an internal air chamber 20 for containing compressed air, for example, from an external source.

The compressed air chamber 20 is pressurized from an air supply line through an inlet 21 provided in the handle 16. In this particular embodiment, the cap 18 is attached to the body portion 14 with screws (not shown). Part of the volume in cap 18 is used to enlarge the volume of the compressed air chamber 20.

The lower portion of the housing 12 is connected to a fastener carrying rail or magazine 28. The front of the magazine 28 is joined with nosepiece 30, which is provided with a fastener drive track 32. A fastener pusher within the magazine 28 (not shown) delivers the fastener into the drive track 32 underneath the end of a fastener striker or driver 33. The driver 33 is fixed to the piston 26 and function together as a unit. A cylinder 34 is mounted in the housing 12. The piston 26 reciprocates in cylinder 34 during operation. To control the movement of the piston 26, a trigger valve 36 positioned near the handle 16 and a main valve 38 are employed. The trigger valve includes a valve stem 37 that is movable when a force is applied on trigger 39, i.e., when the trigger 39 is rotated toward the valve stem 37.

A contact trip assembly 46 is mounted so as to have a forward end extend outwardly of the nosepiece 30 to be actuated when the device 10 is moved into operative engagement with a workpiece. The contact trip assembly 46 includes a portion which is cooperable with the trigger 39 such that movement of the trigger lever is totally prevented until the contact trip engages the workpiece. As a result, the device 10 is prevented from being actuated until the contact trip assembly 46 is engaged with the workpiece. In addition, the contact trip assembly 46 is configured to cooperate with the trigger 39 so as to allow a sequential drive of a fastener into the workpiece or a bump drive of a fastener into the workpiece. In a sequential drive mode or sequential trip (ST) mode, the contact trip assembly 46 is brought in contact with a workpiece and the trigger 39 is actuated to drive a fastener and the trigger is released to repeat the fastener driving operation. In a bump drive mode or contact trip (CT) mode, the trigger 39 is actuated and the fastener is driven into a workpiece by “bumping” the contact trip assembly 46 onto the workpiece. This drive operation can be repeated without having to release the trigger 39.

Figure 2A:
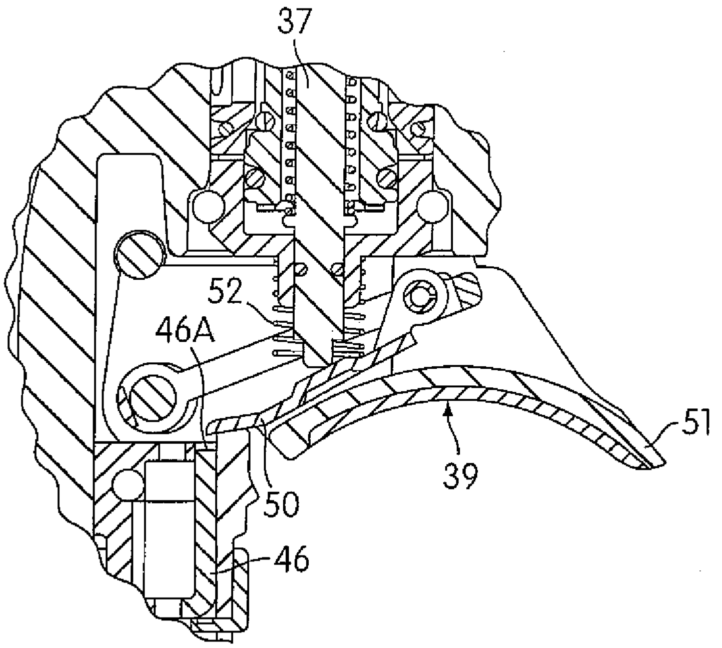
FIGS. 2A and 2B are cross-sectional views of a trigger assembly, according to an embodiment of the present invention.
Figure 2B:
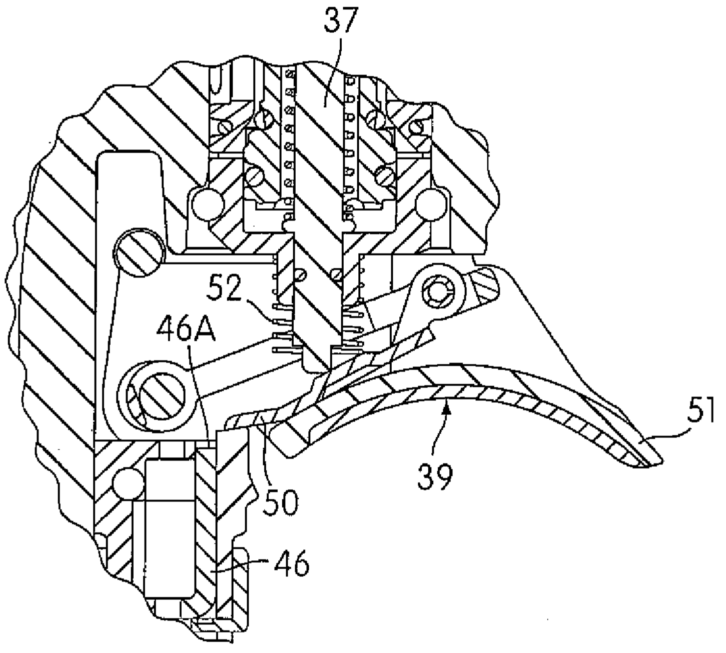

FIGS. 2A and 2B are cross-sectional views of the trigger or trigger assembly, according to an embodiment of the present invention. The trigger or trigger assembly 39 includes a rocker 50 and a trigger lever 51. The rocker 50 is biased towards the trigger lever 51 by resilient member (e.g., coil spring) 52. When the trigger lever 51 is pulled against the bias of the coil spring 52, valve stem 37 is raised when contacted by rocker 50 of the trigger 39 to initiate a drive stroke. FIG. 2A shows a position of an extremity 46A of the contact trip 46 relative to a rocker 50 of the trigger 39 where the rocker 50 is in the path of the contact trip 46 when the trigger lever 51 is pulled. In this position, the rocker 50 can be moved by actuating the contract trip assembly 46. In this configuration, the device 10 can operate in bump drive mode or contact trip mode. FIG. 2B shows a position of the extremity 46A of the contact trip 46 relative to the rocker 50 where the rocker 50 is out of the path of the contact trip 46 when the trigger lever 51 is pulled. In this position, the rocker 50 cannot be moved by actuating the contact trip assembly 46. In this configuration, the device 10 can operate in a sequential drive mode.

Figure 3:
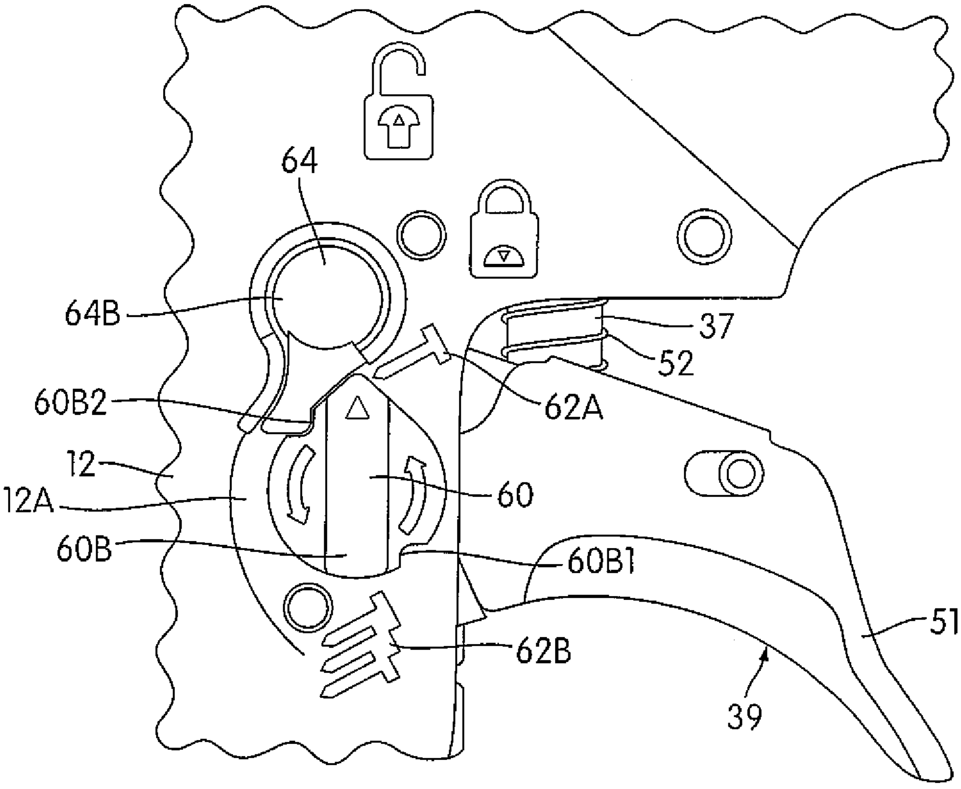
FIG. 3 is an elevational external view of a portion of the fastener driving depicted in FIG. 1 showing a mode selector, according to an embodiment of the present invention.

To select between these two modes of operation of the device 10, the device is provided with a mode selector 60. FIG. 3 is an elevational external view of a portion of the device 10 showing the mode selector 60, according to one embodiment of the present invention. In one embodiment, the mode selector 60 is disposed in the vicinity of the trigger 39. The mode selector 60 is movable to one of two positions. One position is indicated on the device 10 by the symbol 62A, which depicts one fastener, for selecting a sequential mode operation and another position is indicated on the device 10 by the symbol 62B, which depicts a plurality of fasteners, for selecting a bump mode operation. The device 10 also includes a trigger lock 64. The trigger lock 64 operatively engages the mode selector 60. The trigger lock 64 can be switched between a locked position to prevent movement of the trigger lever 51 and an unlocked position to permit movement of the trigger lever 51. In one embodiment, the trigger lock 64 can be switched from a locked to unlocked position by pushing the trigger lock 64 from one side of the device to an opposite side of the device 10, as will be described further in detail in the following paragraphs. In the unlocked position, the trigger lock 64 engages the mode selector 60 to prevent the mode selector 60 from moving, i.e. rotating. In the locked position, the trigger lock 64 disengages from the mode selector 60 so as to permit rotation of mode selector 60, for example to select a desired operational mode of the device 10.

Figure 4A:
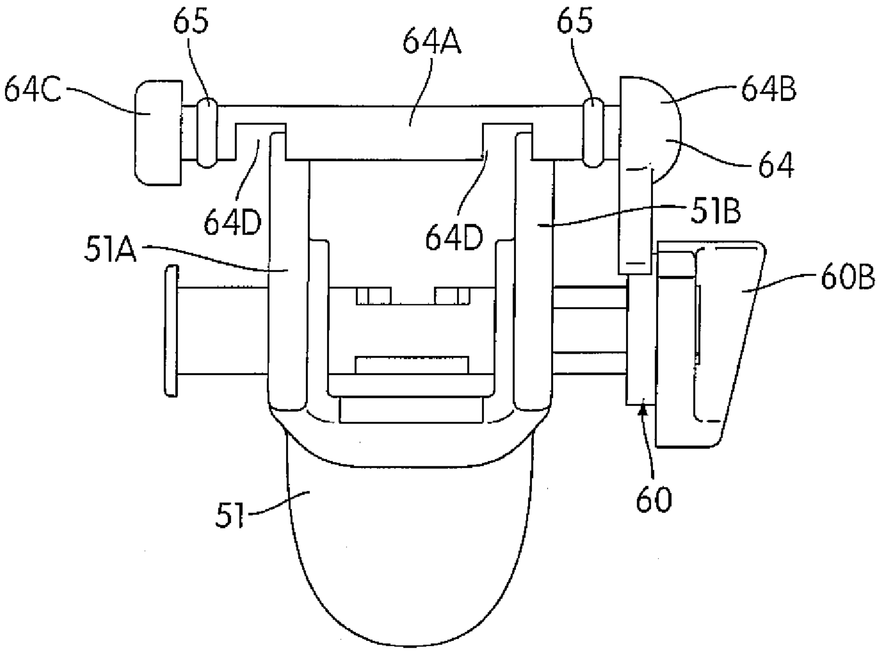
FIGS. 4A and 4B are elevational views showing the relative positions of a trigger lever, the mode selector, and a trigger lock when the trigger lock is in a locked position, according to an embodiment of the present invention.
Figure 4B:
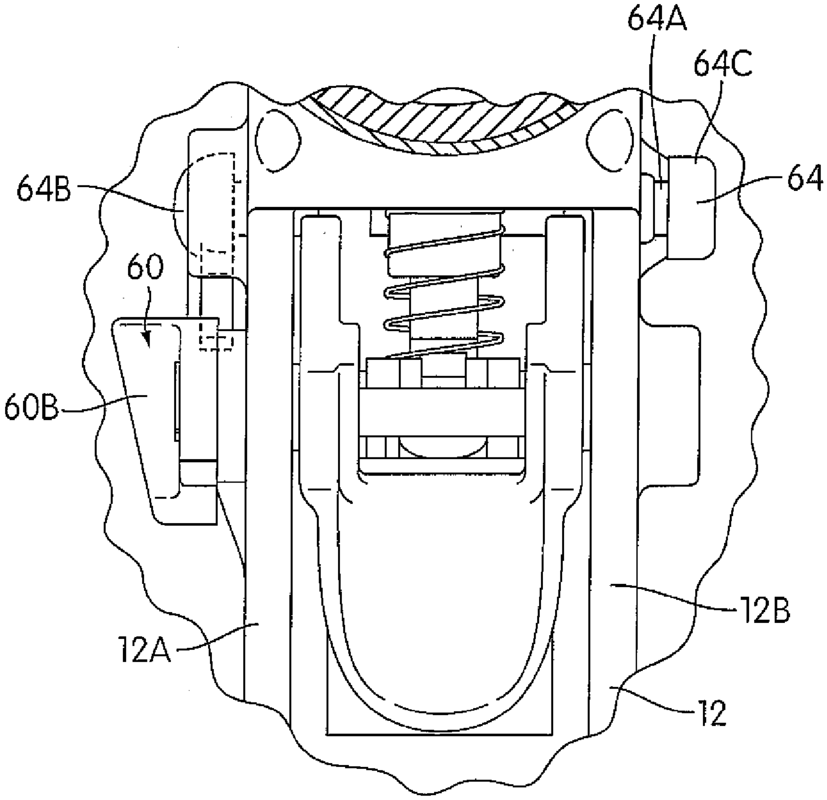
Figure 5A:
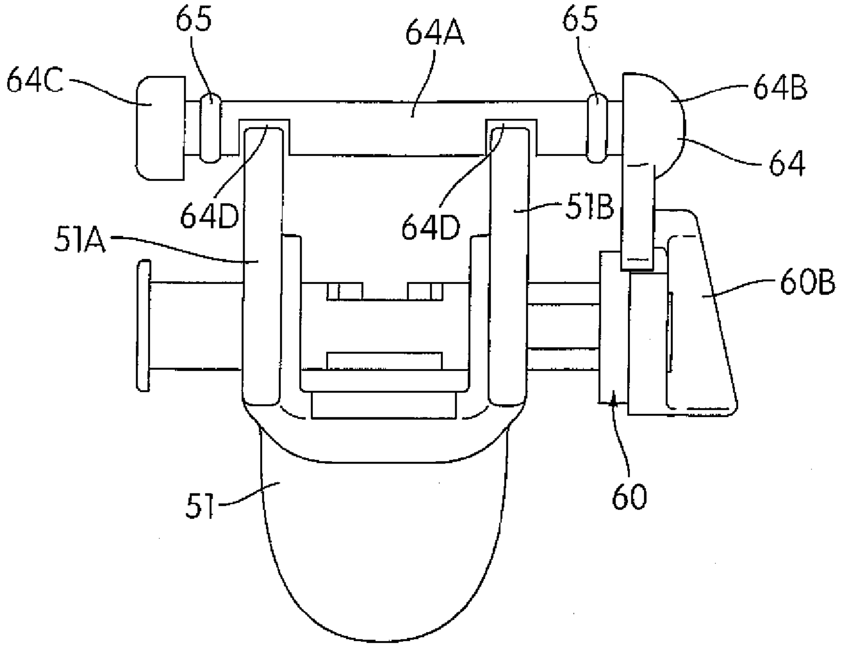
FIGS. 5A and 5B are elevational views showing the relative positions of the trigger lever, the mode selector, and the trigger lock when the trigger lock is in an unlocked position, according to an embodiment of the present invention.
Figure 5B:
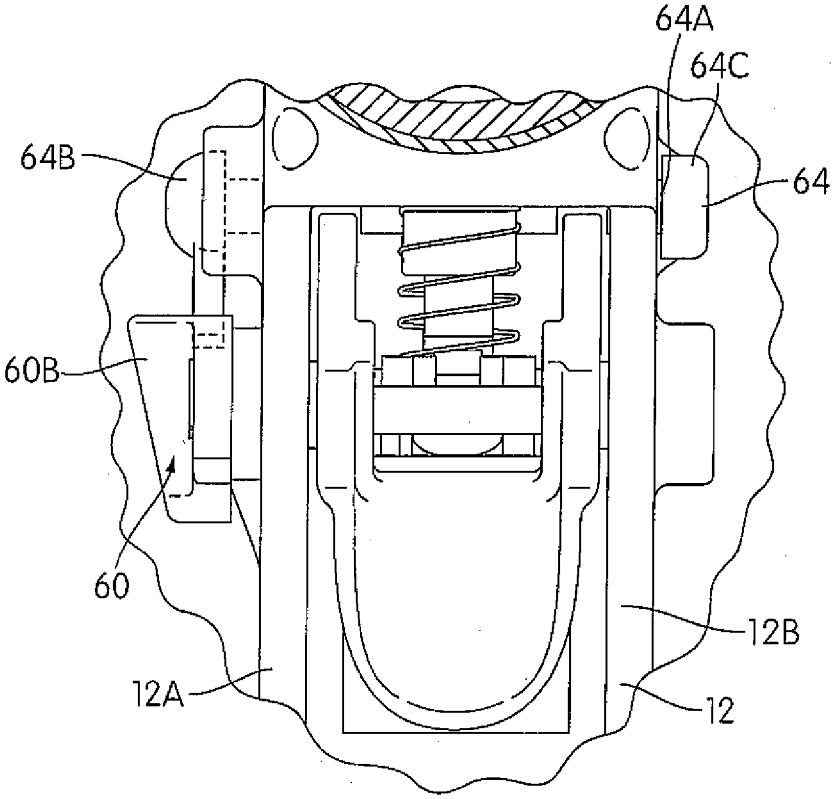

FIGS. 4A and 5A are elevational views showing the relative positions of the trigger lever 51, the mode selector 60 and the trigger lock 64, according to an embodiment of the present invention. FIGS. 4B and 5B are elevational views showing the position of the trigger lever 51, the mode selector 60, and the trigger lock 64 relative to the body of housing 12 of the device 10. As shown in FIGS. 4A and 5A, the trigger lock 64 comprises trigger lock pin 64A, trigger lock handle 64B and trigger lock button 64C. As shown in FIGS. 4B and 5B, the trigger lock pin 64A extends through two frame walls 12A, 12B of the housing 12. The trigger lock handle 64B is mounted to one end of the trigger lock pin 64A and is disposed adjacent wall 12A in the vicinity and operatively engaging the mode selector 60. The trigger lock button 64C is mounted to an opposite end of the trigger lock pin 64A adjacent opposite frame wall 12B. As shown in FIGS. 4A and 5A, the trigger lock pin 64A has two notches 64D.

When the trigger lock pin handle 64B is pushed inwardly towards the frame wall 12A into a locked position, as shown in FIG. 4B, the trigger lock pin 64A interferes and prevents movement of the trigger lever 51 from a down-unactuated position to an up-actuated position. In the locked position, as shown in FIG. 4A, the notches 64D in the trigger lock pin 64A are positioned such that adjacent two portions 51A and 51B of the trigger lever 51 are not aligned with the notches 64D and abut on the trigger lock pin 64A hence preventing movement of the trigger lever 51. When the trigger lock button 64C is pushed inwardly towards the frame wall 12B, the trigger lock pin handle 64B is pushed outwardly away from the frame wall 12A into an unlocked position, as shown in FIG. 5B. In this position, the notches 64D in the trigger lock pin 64A align with the two portions 51A and 51B of the trigger lever 51, as shown in FIG. 5A, hence allowing movement of the trigger lever 51.

The trigger lock pin 64A may be held in the locked and unlocked positions by O-rings 65 mounted on each end of the trigger lock pin 64A for creating a friction fit with apertures formed in the tool frame walls 12A and 12B through which the pin extends.

The trigger lock button 64C may include a flat edge engaging a land formed on the tool frame wall 12B to prevent the trigger lock pin 64A from rotating. The openings or notches 64D in the trigger lock pin 64A are sized and positioned relative to the portions 51A and 51B of the trigger body so that the trigger body portions 51A and 51B move out of the openings 64D only when the trigger lever 51 is all the way down (away from the valve stem 37) in the unactuated position. This ensures that the mode selector 60 can only be adjusted/rotated when the trigger lever 51 is all the way down by permitting movement of the trigger lock pin 64A transversely. If the trigger lock 64 is pushed while the trigger lever 51 is not fully down, the trigger body portions 51A and 51B being inside the notches or openings 64D will prevent movement of the trigger lock pin 64A.

Figure 6:
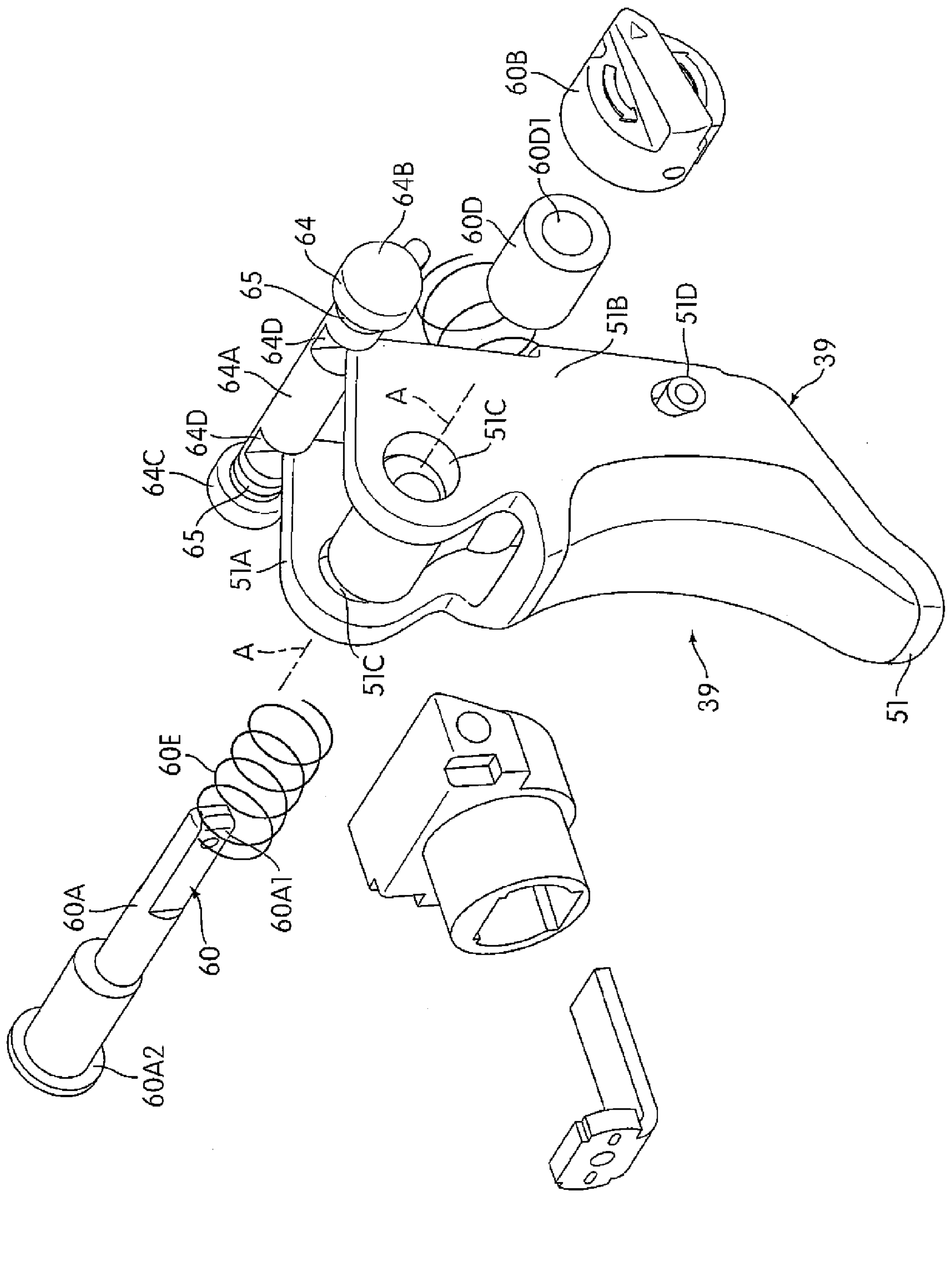
FIG. 6 is an exploded view of the trigger assembly including the trigger lever, trigger lock, and mode selector, according to an embodiment of the present invention.

FIG. 6 is an exploded view of the trigger assembly 39 including the trigger lever 51, trigger lock 64 and mode selector 60, according to an embodiment of the present invention. The mode selector 60 comprises an eccentric pin 60A and a knob 60B. The eccentric pin 60A is mounted to the trigger lever 51 through an opening or hole 51C in the trigger lever 51. One end 60A1 of the eccentric pin 60A is connected to the knob 60B via a cylindrical piece 60D having an eccentric opening 60D1. The cylindrical piece 60D is adapted and sized to rotatably fit in hole 51C in the trigger lever 51. An opposite end 60A2 of eccentric pin 60A is provided with a stop portion that is adapted to abut against body portion 51A of the trigger lever 51 when the eccentric pin 60A is mounted through the opening 51C.

Figure 7:
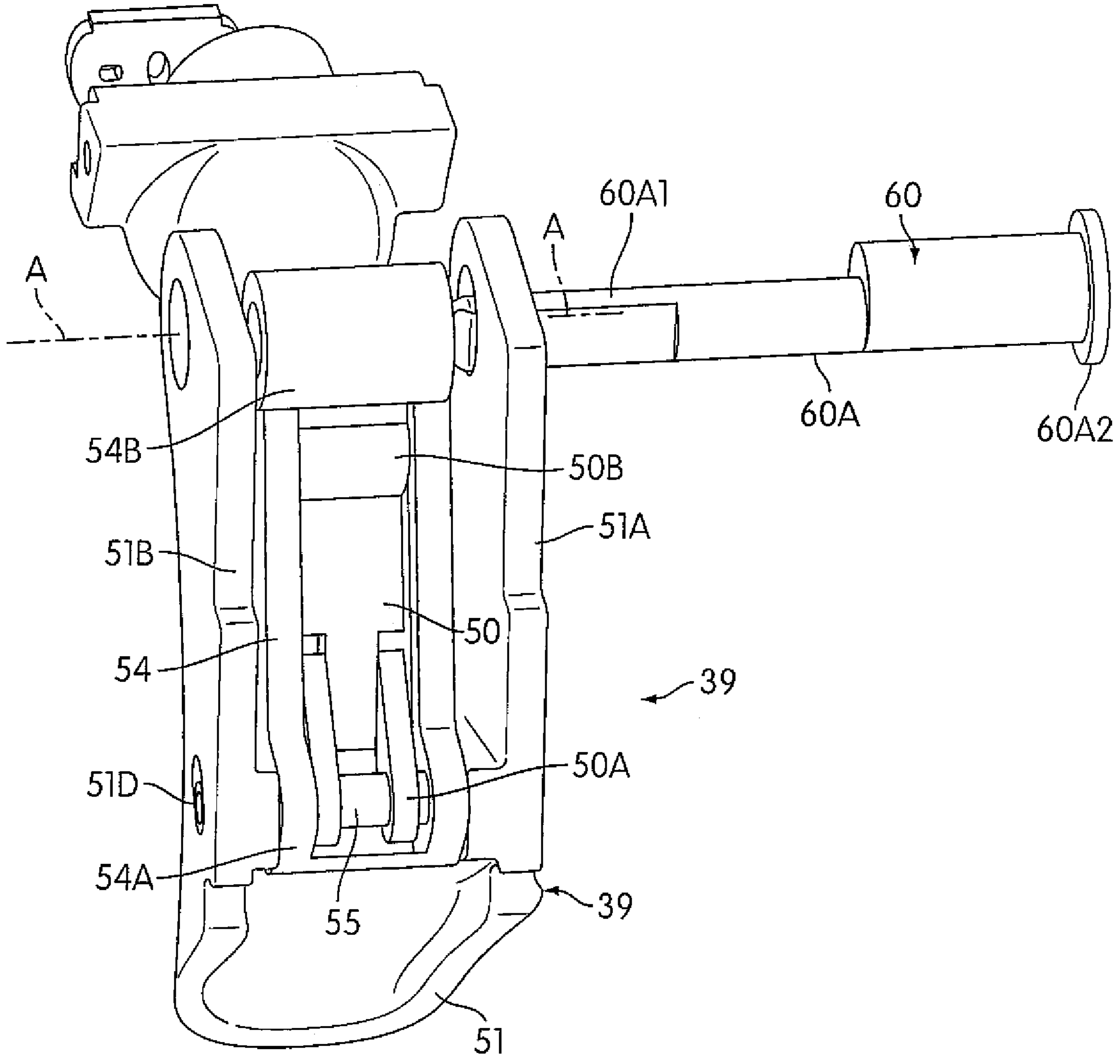
FIG. 7 is a perspective view of the trigger assembly including the trigger lever, mode selector, a rocker and linkage member, according to an embodiment of the present invention.

FIG. 7 is a perspective view of the trigger assembly 39 including the trigger lever 51, mode selector 60, rocker 50 and linkage member 54, according to an embodiment of the present invention. As shown in FIG. 7, one end 54A of linkage member 54 is rotatably linked to extremity 50A of the rocker 50. Both the end 54A of the linkage member 54' and the extremity 50A of the rocker 50 are rotatably mounted to body portions 51A and 51B of the trigger lever 51 via a cam shaft 55. The cam shaft 55 is movably mounted to the body portions 51A and 51B of the trigger lever 51 through slots 51D. The cam shaft 55 can both rotate and translate within the slots 51D. The slots 51D are positioned in the body portions 51A and 51B of the trigger lever 51 so as to allow the linkage member 54 and the rocker 50 to move.

As shown in FIGS. 6 and 7, another end 54B of the linkage member 54 connects to the eccentric pin 60A while another end 50B of the rocker 50 is free to move (e.g., rotate). A resilient member (e.g., spring) 60E is provided axially within the eccentric pin 60A. When the eccentric pin 60A is mounted in the trigger assembly 39, the resilient member 60E abuts against stop portion 60A2 of the eccentric pin 60A on one end and on the opposite end abuts against end portion 54B of the linkage member 54. As a result, the resilient member 60E biases the knob 60B mounted to the end 60A1 of the eccentric pin 60A towards the body portion 51B of the trigger lever 51.

The end 50B of the rocker 50 extends to a position near a top of the contact trip assembly 46 (as shown in FIGS. 2A and 2B). This position of the rocker is changed/moved to switch between sequential and bump modes by rotating the knob 60B of the mode selector switch 60. A rotation of the knob 60B of the mode selector switch 60 causes the eccentric pin 60A to rotate. Because the pin 60A is eccentric relative to axis AA of rotation of the knob 60B, a rotation of the eccentric pin 60A results in a translation of the end 54A of the linkage member 54 and hence of a displacement of the end 50A of the rocker 50 and ultimately in a position change of the end 50B of the rocker 50 relative to the contact trip assembly 46 (shown in FIGS. 2A and 2B). The pivot point of the trigger lever 51 does not move.

As shown in FIG. 3, the knob 60B of the mode selector switch 60 has a pair of notches 60B1 and 60B2. The notches 60B1 and 60B2 are configured to receive the trigger lock pin handle 64B of the trigger lock pin 64 when the trigger lock pin 64 is in an unlocked position. In this position, the engagement of the trigger lock pin handle 64B with the knob 60B prevents rotation of the mode selector switch 60. Hence, the mode selector switch 60 is configured such that it cannot be inadvertently rotated since the trigger lock pin handle 64B must be pushed into the locked position out of engagement with the mode selector switch knob 60B in order to rotate the knob 60B. In one embodiment, to minimize the likelihood that an inadvertent pushing force is applied to the trigger lock pin handle 64B, a raised boss may be formed on the outer frame body 12A (see FIGS. 4B and 5B).

In addition, the fastener device 10 is configured so as to prevent operation with the mode selector switch 60 in an intermediate position, i.e., where the knob 60B is rotated to a position other than a position indicated by the marks 62A and 62B (see FIG. 3) corresponding to the ST and CT mode positions. Indeed, in order to move the mode selector switch knob 60B into an intermediate position, the trigger lock pin 64 must be pushed to disengage from the mode selector switch knob 60B. However, disengaging the trigger lock pin 60 (i.e., disengaging the handle 64B) from the selector switch knob 60B also causes the trigger lock pin 60 to lock the trigger 39 in the de-actuated position by blocking the movement of the trigger lever 51 by shifting the notches 64D in the trigger lock pin 60 from the trajectory of the trigger lever frame portions 51A and 51B.

In addition, although the interlock assembly is described herein as being used in a pneumatic type fastener driving device, as it can be appreciated the interlock assembly may be used on any fastener driving tool, such as a nail or staple gun, having a trigger and a mode selector switch. The fastener driving tool may be operated/powered by any means such as pneumatic, spring, pressurized gas, combustion, flywheel, electric motor, and any combination of these.

Figure 8:
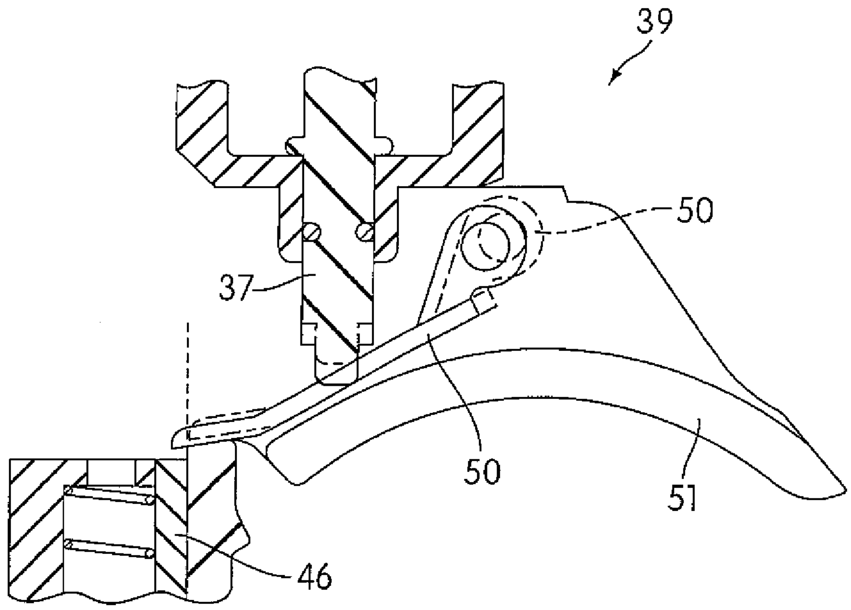
FIG. 8 is a cross-sectional view of the trigger assembly showing the position of the rocker relative to an end of a contact trip, according to an embodiment of the present invention.

FIG. 8 is a cross-sectional view of the trigger assembly 39 showing the position of the rocker 50 relative to an end of the contact trip 46, according to an embodiment of the present invention. In FIG. 8, the trigger lever 51 is shown actuated or pulled before actuating the contact trip 46 by placing the device 10 against a workpiece. When the mode selector switch 60 is rotated by 180 degree, the linkage member 54 will be moved by the eccentric pin 60A of the mode selector switch 60, as discussed in the above paragraphs. As a result, the rocker 50 will correspondingly be moved into or away from the path of the contact trip 46. Specifically, in contact or bump mode, the rocker 50 is positioned at a forward position (the rocker with a solid line). In this position, the rocker 50 is in the path of the contact trip 46. When a user places the device 10 against the workpiece, the contact trip 46 will move, i.e., rotate, the rocker 50 upwardly which in turn presses on valve stem 37 to initiate a drive stroke. In sequential mode, the rocker 50 is positioned at backward position (the rocker with a dotted line). In this position, the rocker 50 is not in the path of the contact trip 46. When a user places the device 10 against the workpiece while the trigger lever 51 is actuated, the contact trip 46 will not move the rocker 50 and as a result the device 10 will not be actuated.

Figure 9:
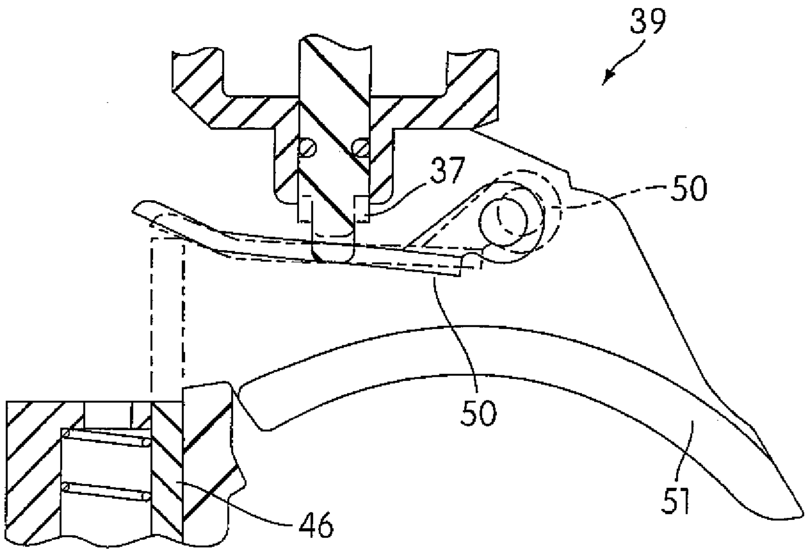
FIG. 9 is a cross-sectional view of the trigger assembly showing the position of the rocker relative to the contact trip, according to an embodiment of the present invention.

FIG. 9 is a cross-sectional view of the trigger assembly 39 showing the position of the rocker 50 relative to the contact trip 46, according to an embodiment of the present invention. In FIG. 9, the device 10 is first placed against the workpiece. The solid line rocker 50 and the dotted line rocker 50 in FIG. 9 indicate the position of the rocker 50 when the mode selector switch is rotated to either contact mode or sequential mode, respectively. In contact mode, the rocker 50 has a greater extension over a thickness of the contact trip 46, i.e., path of the contact trip 46. While in sequential mode, the excursion of the rocker 50 into the path of the contact trip 46 (indicated in dotted lines in FIG. 9) is smaller. As a result, in sequential mode, when the trigger lever 51 is actuated or pulled, the rocker will push upon the valve stem 37 to actuate the device. However, once the tip of contact trip 46 drops below a certain threshold (e.g. about 5 mm from a full extension of the contact trip 46) due to either the user raising the device 10 from the workpiece or to the recoil motion of the device 10, the rocker 50 will slip off the tip of the contact trip 46 and hence the device 10 cannot be actuated again unless the user releases the trigger lever 51. Thus, the device 10 resets automatically. Another actuation cannot be implemented until the user releases the trigger lever 51 and raises the device 10 from the workpiece.

Figure 10:
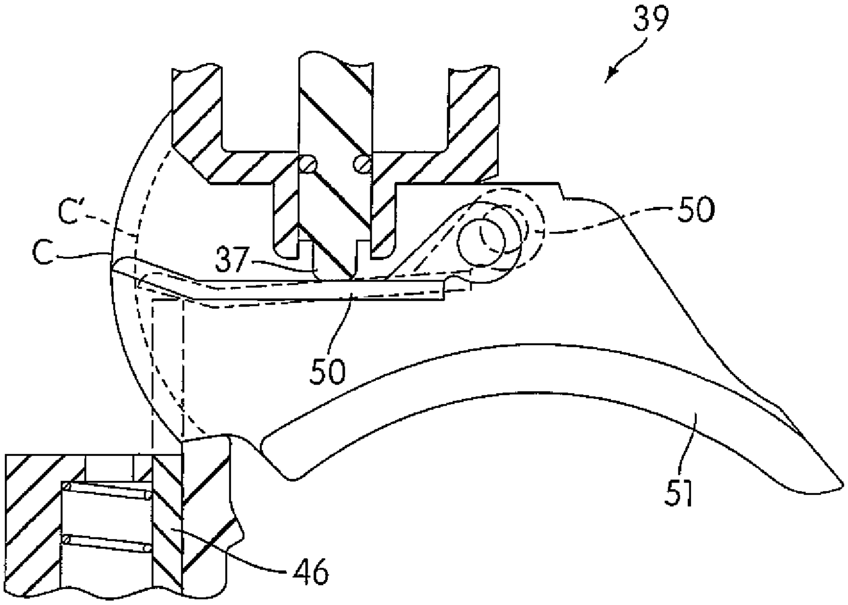
FIG. 10 is a cross-sectional view of the trigger assembly showing the trajectory of a tip of the rocker relative to a tip of the contact trip, according to an embodiment of the present invention.

FIG. 10 is a cross-sectional view of the trigger assembly showing the trajectory of the tip of the rocker 50 relative to the tip of the contact trip 46, according to an embodiment of the present invention. FIG. 10 shows the trigger lever 51 actuated after the device 10 is placed against the workpiece. The solid circle C shows the trajectory of the tip of the rocker 50 when the device 10 is operated in contact mode and the dotted circle C' shows the trajectory of the tip of the rocker 50 when the device 10 is operated in sequential mode. In contact mode, the solid circle trajectory C of the tip of the rocker 50 shows that the rocker 50 will always remain above the contact trip 46 before and after actuation of the trigger lever 51. As a result, either by actuating the trigger lever 51 or pushing the device 10 against the workpiece, the device 10 can be actuated and re-set and re-activated again. Whereas, in sequential mode, the circle C' trajectory shows that the tip of the rocker 50 will slip off the path of the contact trip 46 after the tip of the contact trip 46 drops below a certain threshold (e.g., about 5 mm from the full extension of the tip of contact trip 46). Hence, the device 10 cannot be actuated again unless the user releases the trigger lever 51.

In sequential mode, the device can only be actuated by sequentially placing the device 10 against the workpiece to actuate the contact trip 46 and then actuating the trigger lever 51. If the trigger lever 51 is actuated before placing the device 10 against the workpiece, the device 10 will not be actuated.

Figure 11A:
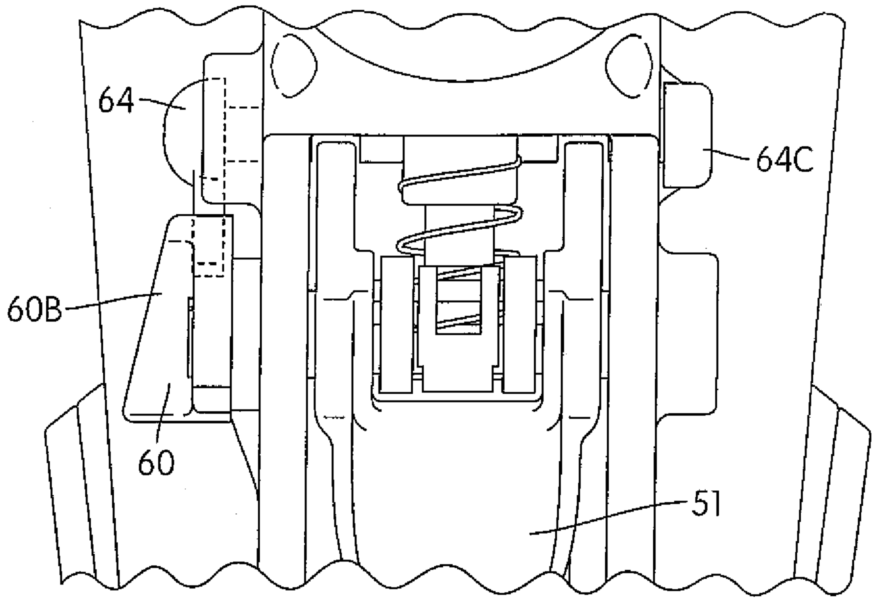
FIGS. 11A-11D depict a sequence for selecting the mode of operation of the fastener driving device, according to an embodiment of the present invention.
Figure 11B:
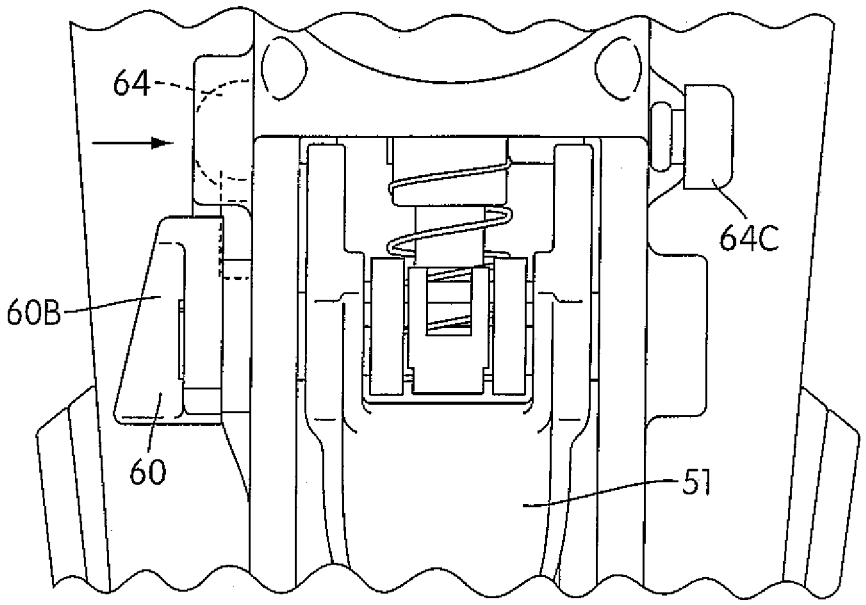
Figure 11C:
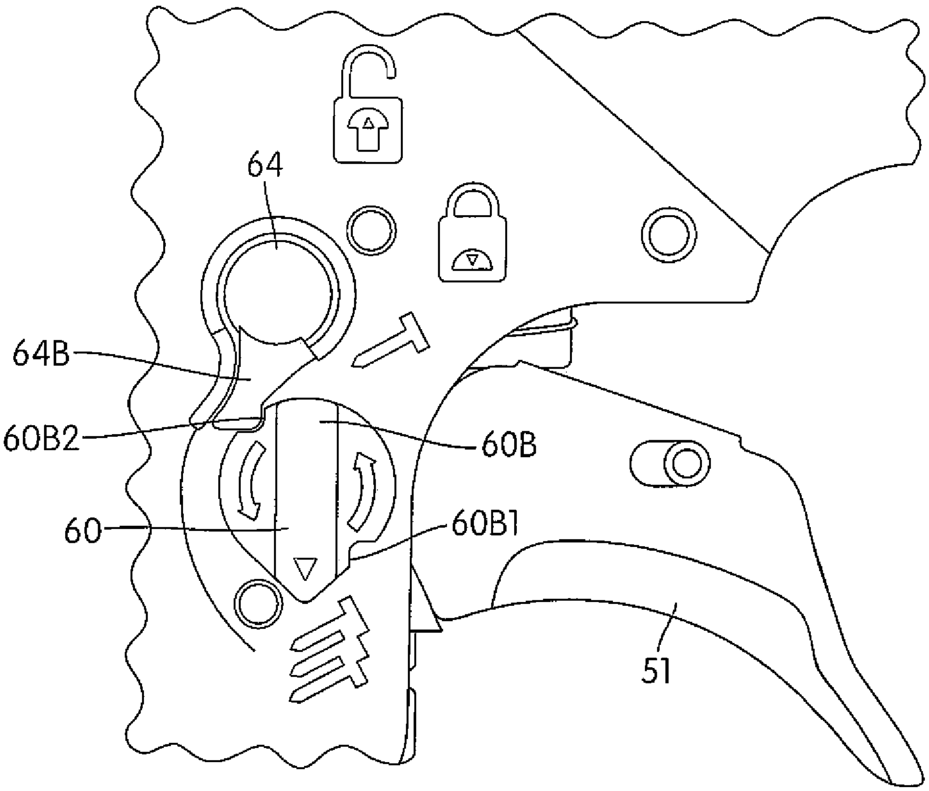
Figure 11D:
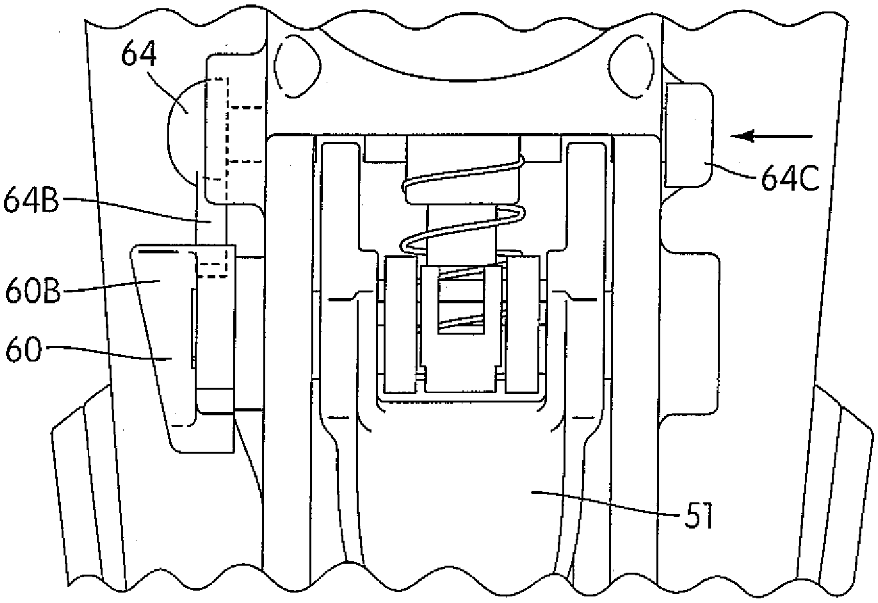

FIGS. 11A-11D depict a sequence for selecting the mode of operation of the device (i.e., for switching from a sequential mode to a contact trip mode or vice versa), according to an embodiment of the present invention. In this embodiment, the selection can be accomplished in a three-step process. As shown in FIG. 11A, when the trigger lock 64 is in the unlocked position, the trigger lever 51 is not locked. However, the selector switch 60 is locked as the trigger lock pin handle 64B engages notch 60B1 or notch 60B2 of the mode selector switch 60. When the trigger lock pin handle 64B is pushed against the frame of the device 10, in a first step, as indicated by the arrow in FIG. 1B, the trigger lever 51 is locked and cannot be actuated (as explained in the above paragraphs). However, the selector switch 60 is free to rotate as the trigger lock pin handle 64B is released from the notch 60B1 or 60B2 of the mode selector switch 60. In a second step, the mode selector switch can then be rotated (e.g., for example one half turn counter-clockwise) to the desired mode, as indicated in FIG. 11C. In a third step, the trigger lock button 64C of the trigger lock 64 can then be pushed in the direction of the arrow as indicated in FIG. 11D. In this position of the trigger lock 64 (unlocked), the selector switch 60 is no longer free to rotate as the trigger lock handle 64B engages the notch 60B1 or 60B1 in the mode selector knob 60B. However, the trigger lever 51 is not locked. Hence, the device 10 can be actuated.

Figure 12A:
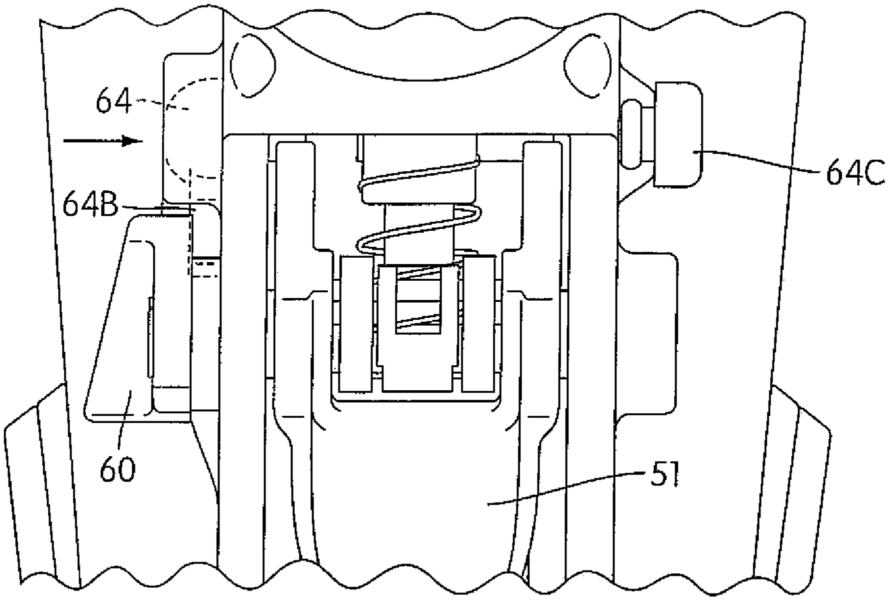
FIGS. 12A-12F depict a sequence for selecting the mode of operation of the fastener driving device, according to another embodiment of the present invention.
Figure 12B:
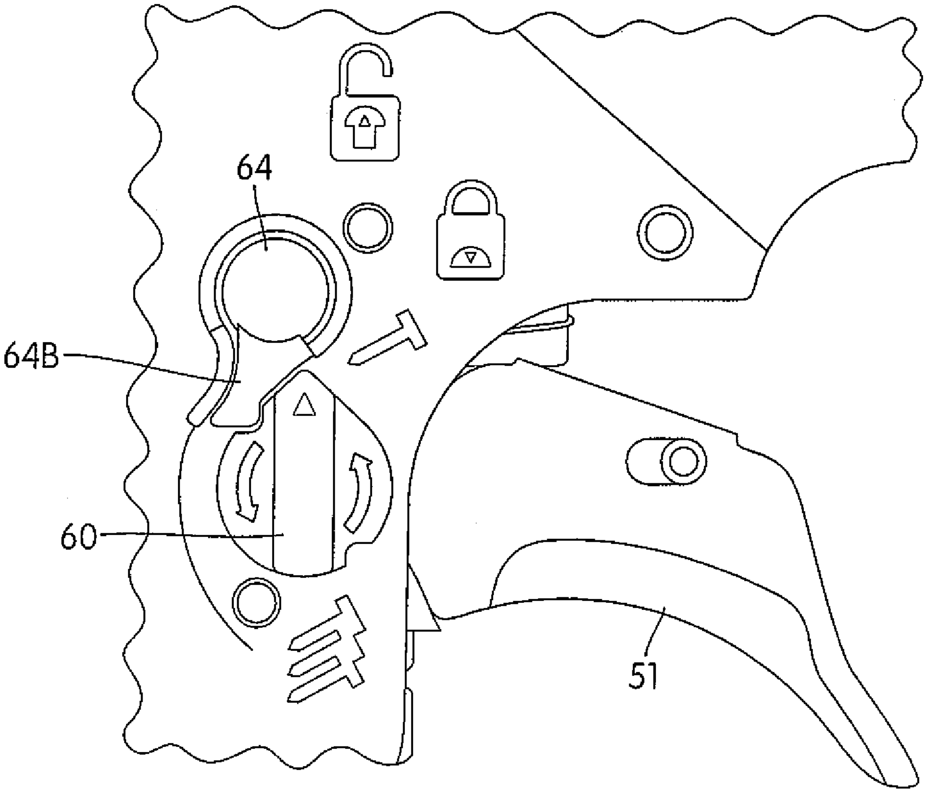
Figure 12C:
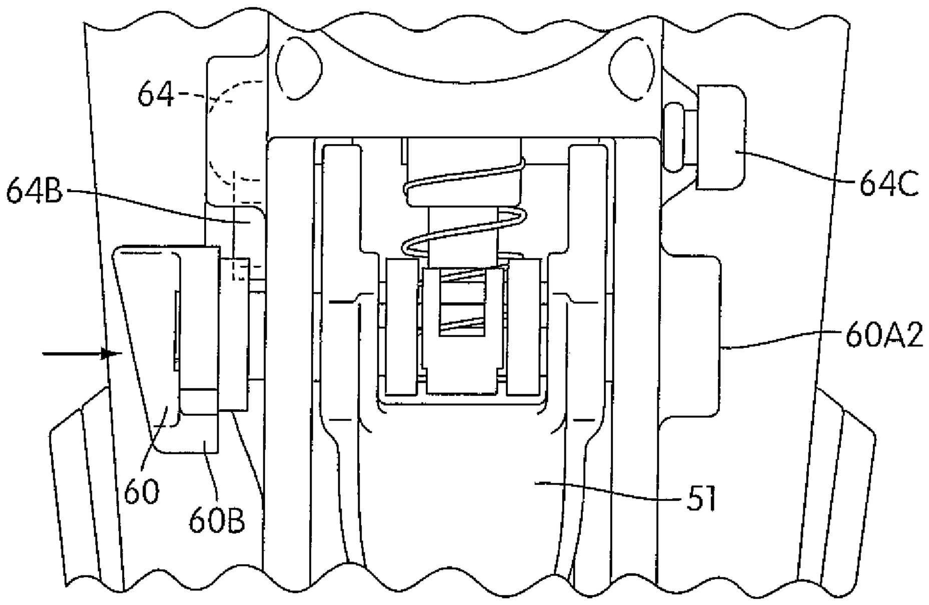
Figure 12D:
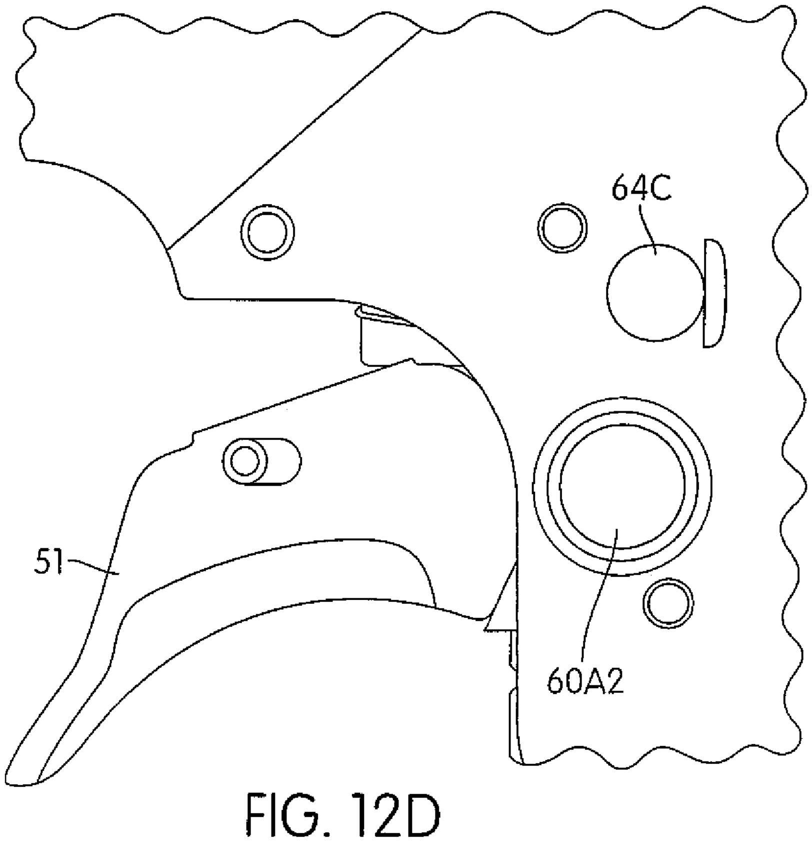
Figure 12E:
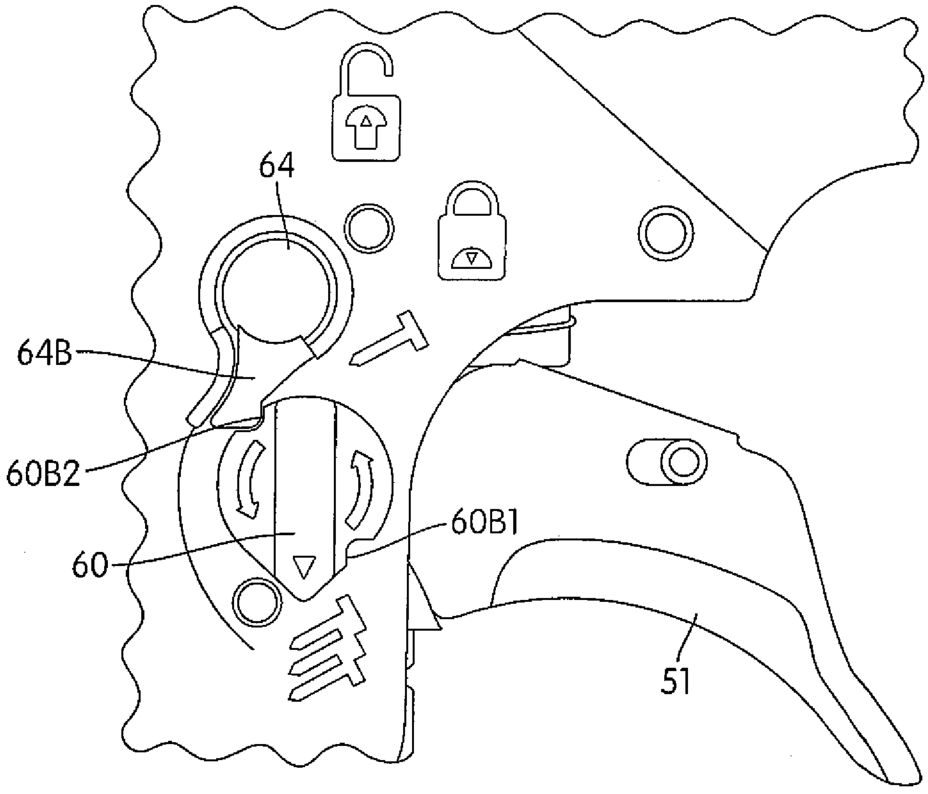
Figure 12F:
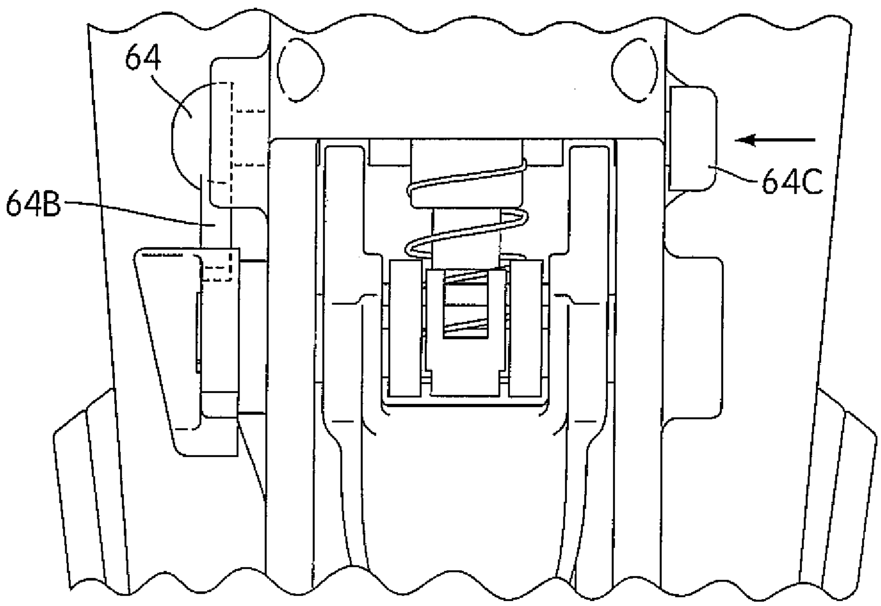

FIGS. 12A-12F depict a sequence for selecting the mode of operation of the device (i.e., for switching from a sequential mode to a contact trip mode or vice versa), according to another embodiment of the present invention. In this embodiment, the selection can be accomplished in a four-step process. The four-step process is similar to the three-step process described above except that an additional step is required between the first and second steps of the three-step process. Similar to the above embodiment, when the trigger lock 60 is pushed against the frame of the device 10, in a first step, as indicated by the arrow in FIG. 12A, the trigger lever 51 is locked and cannot be actuated. However, contrary to the three-step process, the selector switch 60 is not yet free to rotate as the trigger lock pin handle 64B remains engaged with the notch 60B1 or 60B2 of the mode selector switch 60. In a second step, in order to allow the mode selector switch 60 to be rotated (e.g., for example one half turn counter-clockwise) to the desired selection mode, as indicated in FIG. 12B, because the selector switch. 60 is biased by the spring 60E (shown in FIG. 6) to automatically push the knob 60B of the selector switch 60 towards the frame of the device 10, as shown by the arrow in FIG. 12C, the stop end 60A2 of the eccentric pin 60A of the selector switch 60 should be pushed opposite to the arrow in FIG. 12C to counteract the biasing force of the spring, as shown in FIG. 12D, so as to release the lock pin handle 64 from the notch 60B1 or 60B2. In a third step, the mode selector switch 60 can then be rotated (e.g., one half turn counter-clockwise) to the desired selection mode, as indicated in FIG. 12E. The user can then release the counteracting force applied to the end stop 60A2. Once the mode selector switch 60 is positioned at the desired mode (sequential mode or contact/bump mode) and the user releases the force applied to the end stop 60A2, the mode selector switch 60 moves automatically towards the frame due to the biasing spring force when either notch 60B1 or 60B2 is aligned with the arm 64B. In a fourth step, the trigger lock button 64C of the trigger lock 64 can then be pushed in the direction of the arrow, as indicated in FIG. 12F. In this position of the trigger lock 64, the selector switch 60 is no longer free to rotate. However, the trigger lever 51 is not locked. Hence, the device 10 can be actuated.

It must be understood the terms such as upper, lower, above, downward and the like are used in reference to the figures shown in the drawings solely for the purpose of clarity. While the preferred embodiment of the present invention has been shown, it is anticipated those skilled in the art may make numerous changes and modifications without departing from the spirit of this invention which is intended to be limited only by the scope of the following appended claims.

While the invention has been described in connection with particular embodiments, it is to be understood that the invention is not limited to only the embodiments described, but on the contrary it is intended to cover all modifications and arrangements included within the spirit and scope of the invention as defined by the claims, which follow.

What is claimed is:

1. A fastener driving device comprising:

a frame;

a fastener driver reciprocally mounted in the frame, the fastener driver constructed and arranged to drive a fastener into a workpiece during a drive stroke; and a trigger assembly comprising a trigger lever configured to be moved to actuate the fastener driving device, a mode selector movably mounted to the frame, the mode selector being configured to move to select between a first mode of operation of the fastener driving device and a second mode of operation of the fastener driving device, and a trigger lock mounted to the frame, the trigger lock comprising a trigger lock pin and a trigger lock handle at one end of the trigger lock pin, the trigger lock being movable relative to the trigger lever between a first position in which the trigger lock pin does not interfere with the trigger lever and allows movement of the trigger lever to actuate the fastener driving device and a second position in which the trigger lock pin interferes with the trigger lever and prevents movement of the trigger lever, wherein, when the trigger lock is in the first position, the trigger lock handle is engaged with the mode selector to prevent the mode selector from moving, and wherein, when the trigger lock is in the second position, the trigger lock handle is disengaged from the mode selector to permit movement of the mode selector to select the mode of operation of the fastener driving device.

2. The fastener driving device according to claim 1, wherein the mode selector is rotatably mounted to the frame.

3. The fastener driving device according to claim 2, wherein the trigger assembly further comprises a rocker rotatably mounted to the trigger lever.

4. The fastener driving device according to claim 3, wherein the rocker is biased toward the trigger lever by a resilient member.

5. The fastener driving device according to claim 3, wherein the trigger assembly further comprises a linkage member rotatably linked to the rocker and to the trigger lever.

6. The fastener driving device according to claim 5, wherein the trigger assembly further comprises a cam shaft and a first extremity of the linkage member and a first extremity of the rocker are mounted to the cam shaft, the cam shaft being movably mounted to the trigger lever.

7. The fastener driving device according to claim 6, wherein the mode selector comprises an eccentric pin and a knob, wherein a second extremity of the linkage member is connected to the eccentric pin and a second extremity of the rocker is free to move.

8. The fastener driving device according to claim 7, further comprising a contact trip assembly operatively disposed within a nosepiece of fastener driving device, wherein the second extremity of the rocker extends to a position near a top of the contact trip assembly.

9. The fastener driving device according to claim 7, wherein the knob is rotatable to switch between a sequential mode of operation of the fastener driving device and a bump mode of operation of the fastener driving device.

10. The fastener driving device according to claim 7, wherein a rotation of the knob results in a translation of the first extremity of the linkage member and a displacement of the second extremity of the rocker relative to the contact arm.

11. The fastener driving device according to claim 10, wherein, when the knob is in a first position corresponding to the bump mode of operation, the second extremity of the rocker moves at a forward position within a path of the contact trip assembly, and when the knob is in a second position corresponding to the sequential mode of operation, the second extremity of the rocker moves away from the path of the contact trip assembly.

12. The fastener driving device according to claim 7, wherein the knob comprises a pair of notches configured to receive the trigger lock handle when the trigger lock is in the first position.

13. A trigger assembly for a fastener driving device, the trigger assembly comprising:

a trigger lever configured to be moved to an actuated position;

a mode selector configured to be movably mounted to the fastener driving device, the mode selector being configured to move to select between a first mode of operation of the fastener driving device and a second mode of operation of the fastener driving device; and a trigger lock configured to be mounted to the fastener driving device, the trigger lock comprising a trigger lock pin and a trigger lock handle at one end of the trigger lock pin, the trigger lock being movable relative to the trigger lever between a first position in which the trigger lock pin does not interfere with the trigger lever and allows movement of the trigger lever to the actuated position and a second position in which the trigger lock pin interferes with the trigger lever and prevents movement of the trigger lever to the actuation position, wherein, when the trigger lock is in the first position, the trigger lock handle is engaged with the mode selector to prevent the mode selector from moving, and wherein, when the trigger lock is in the second position, the trigger lock handle is disengaged from the mode selector to permit movement of the mode selector to select the mode of operation of the fastener driving device.

* * * * *